(12) United States Patent
Roth et al.

(10) Patent No.: US 10,798,786 B2
(45) Date of Patent: Oct. 6, 2020

(54) COOKING APPLIANCE WITH A COOKING PLATE AND WITH A HEATING DEVICE THEREUNDER

(71) Applicant: E.G.O. Elektro-Geraetebau GmbH, Oberderdingen (DE)

(72) Inventors: Martin Roth, Kraichtal (DE); Volker Block, Bretten (DE); Matthias Mandl, Bretten (DE); Michael Tafferner, Malsch (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 335 days.

(21) Appl. No.: 15/827,569

(22) Filed: Nov. 30, 2017

(65) Prior Publication Data
US 2018/0153341 A1 Jun. 7, 2018

(30) Foreign Application Priority Data
Dec. 2, 2016 (DE) .................. 10 2016 224 069

(51) Int. Cl.
*H05B 3/74* (2006.01)
*A47J 37/06* (2006.01)
*H05B 3/68* (2006.01)

(52) U.S. Cl.
CPC ............ *H05B 3/74* (2013.01); *A47J 37/0676* (2013.01); *H05B 3/68* (2013.01); *H05B 3/748* (2013.01)

(58) Field of Classification Search
CPC ....... A47J 37/0676; A47J 37/067; H05B 3/22; H05B 3/262; H05B 3/28; H05B 3/68; H05B 3/74; H05B 3/748; H05B 2203/009; H05B 2203/01; H05B 2203/037; H05B 2203/013; H05B 3/20; H05B 3/26; H05B 2203/003; H05B 2203/005

See application file for complete search history.

(56) References Cited

U.S. PATENT DOCUMENTS

| 2,010,768 A | * | 8/1935 | Morgan | H05B 3/748 |
| | | | | 219/540 |
| 2,640,906 A | | 6/1953 | Haynes | |
| 4,286,377 A | * | 9/1981 | Hurko | G01K 7/183 |
| | | | | 219/448.17 |

(Continued)

FOREIGN PATENT DOCUMENTS

| DE | 3810586 A1 | 10/1989 |
| DE | 19833983 A1 | 2/2000 |

(Continued)

*Primary Examiner* — Patrick M. Buechner
(74) *Attorney, Agent, or Firm* — Alston & Bird LLP

(57) ABSTRACT

A cooking appliance has a cooking plate for the direct preparation of food products thereon and has a heating device thereunder, wherein the heating device runs parallel to the cooking plate and bears at least partially against the bottom side of the cooking plate. The heating device has a flat carrier disc running parallel to the cooking plate, on the bottom side and top side of which carrier disc there are arranged in each case heating means which in each case substantially cover the carrier disc. Both heating means have in each case a multiplicity of heating conductors to cover the bottom side and top side of the carrier disc. The carrier disc may be composed of micanite, and the heating conductors may be thick-film heating conductors.

22 Claims, 2 Drawing Sheets

(56) References Cited

U.S. PATENT DOCUMENTS

| | | | | |
|---|---|---|---|---|
| 4,384,192 A * | 5/1983 | Lowell | ............... | H05B 3/68 |
| | | | | 219/465.1 |
| 4,430,558 A * | 2/1984 | McWilliams | ....... | H05B 1/0216 |
| | | | | 219/448.19 |
| 4,960,978 A * | 10/1990 | Lorenz | ............... | H05B 3/72 |
| | | | | 219/448.17 |
| 4,999,049 A * | 3/1991 | Balderson | ............ | H05B 3/26 |
| | | | | 219/553 |
| 5,039,840 A * | 8/1991 | Boardman | ............ | H05B 3/26 |
| | | | | 219/270 |
| 5,177,341 A * | 1/1993 | Balderson | ............ | H05B 3/26 |
| | | | | 219/543 |
| 5,352,862 A * | 10/1994 | Barr | ............... | F01M 5/021 |
| | | | | 123/142.5 R |
| 5,422,459 A * | 6/1995 | Zhou | ............... | H05B 3/72 |
| | | | | 219/465.1 |
| 5,498,854 A * | 3/1996 | McWilliams | ......... | H05B 3/748 |
| | | | | 219/449.1 |
| 5,822,675 A * | 10/1998 | Paquet | ............ | H05B 3/148 |
| | | | | 428/561 |
| 6,043,467 A * | 3/2000 | Little | ............ | H05B 1/0269 |
| | | | | 219/542 |
| 6,150,636 A * | 11/2000 | Bogdanski | ............ | A47J 27/002 |
| | | | | 219/443.1 |
| 6,211,582 B1 | 4/2001 | Reimold et al. | | |
| 6,225,608 B1 * | 5/2001 | Kallgren | ............ | H05B 3/265 |
| | | | | 219/465.1 |
| 6,242,722 B1 * | 6/2001 | Provancha | ............ | H05B 3/748 |
| | | | | 118/725 |
| 6,492,629 B1 * | 12/2002 | Sopory | ............ | H05B 3/36 |
| | | | | 219/535 |
| 6,552,307 B2 * | 4/2003 | Schilling | ............ | H05B 3/746 |
| | | | | 219/447.1 |
| 6,689,286 B2 * | 2/2004 | Wilde | ............ | C04B 28/02 |
| | | | | 106/600 |
| 6,765,179 B2 * | 7/2004 | Wilde | ............ | H05B 3/746 |
| | | | | 219/447.1 |
| 6,921,506 B1 * | 7/2005 | Mitchell | ............ | C04B 18/146 |
| | | | | 264/109 |
| 7,812,288 B2 * | 10/2010 | Ose | ............ | H05B 3/746 |
| | | | | 219/448.13 |
| 9,894,716 B2 * | 2/2018 | Mohr | ............ | H05B 1/0216 |
| 2001/0003336 A1 * | 6/2001 | Abbott | ............ | F27D 11/02 |
| | | | | 219/543 |
| 2002/0121510 A1 * | 9/2002 | Petri | ............ | H05B 3/74 |
| | | | | 219/460.1 |
| 2004/0104212 A1 | 6/2004 | Gadow et al. | | |
| 2004/0182850 A1 * | 9/2004 | Wilde | ............ | H05B 3/746 |
| | | | | 219/446.1 |
| 2004/0195232 A1 * | 10/2004 | Wilkins | ............ | H05B 3/746 |
| | | | | 219/448.13 |
| 2008/0020214 A1 * | 1/2008 | Kawai | ............ | B01J 19/0046 |
| | | | | 428/457 |
| 2008/0217324 A1 * | 9/2008 | Abbott | ............ | C23C 4/06 |
| | | | | 219/538 |
| 2009/0272728 A1 * | 11/2009 | Abbott | ............ | F24C 7/04 |
| | | | | 219/399 |
| 2011/0198341 A1 * | 8/2011 | Gilmore | ............ | H05B 3/342 |
| | | | | 219/539 |
| 2015/0164272 A1 * | 6/2015 | Holzapfel | ............ | F24C 15/16 |
| | | | | 99/340 |
| 2015/0297029 A1 * | 10/2015 | Smith | ............ | A47J 31/542 |
| | | | | 426/523 |
| 2015/0382403 A1 * | 12/2015 | Philip | ............ | H05B 3/145 |
| | | | | 219/213 |
| 2017/0086257 A1 * | 3/2017 | Muehlnikel | ........ | H05B 1/0244 |
| 2017/0181226 A1 | 6/2017 | Muehlnikel et al. | | |
| 2017/0347399 A1 | 11/2017 | Muehlnikel et al. | | |
| 2018/0042424 A1 * | 2/2018 | Yin | ............ | A47J 36/04 |
| 2018/0103511 A1 * | 4/2018 | Frank | ............ | H05B 6/062 |
| 2018/0192821 A1 * | 7/2018 | Wang | ............ | A47J 37/067 |
| 2018/0352609 A1 * | 12/2018 | Huang | ............ | H05B 3/02 |
| 2020/0006095 A1 * | 1/2020 | Miwa | ............ | H05B 3/10 |
| 2020/0025388 A1 * | 1/2020 | Rickert | ............ | F24C 7/046 |

FOREIGN PATENT DOCUMENTS

| | | |
|---|---|---|
| DE | 102016209012 A1 | 6/2017 |
| EP | 0873669 B1 | 4/2002 |
| WO | WO 02/078397 A1 | 10/2002 |

* cited by examiner

COOKING APPLIANCE WITH A COOKING PLATE AND WITH A HEATING DEVICE THEREUNDER

CROSS-REFERENCE TO RELATED APPLICATIONS

This application claims priority to German Application No. 10 2016 224 069.2, filed Dec. 2, 2016, the contents of which are hereby incorporated herein in its entirety by reference.

TECHNOLOGICAL FIELD

The invention relates to a cooking appliance with a cooking plate and with a heating device thereunder, wherein in particular, the cooking appliance with the cooking plate is intended to be used for the preparation of food products directly thereon. It is thus possible, for example, for pancakes or crêpes to be prepared thereon, or alternatively also dough cakes. With very high temperatures, grilling can also be performed thereon.

BACKGROUND

From the prior art, it is for example known for cooking appliances to be formed with a cooking plate composed of glass ceramic and with a radiation heating device thereunder, such that a placed-on pot or the like can be thereby heated. Furthermore, so-called hotplates are known by means of which pots or the like being placed on the hotplates with food products therein can be kept hot.

BRIEF SUMMARY

The invention is based on the problem of providing a cooking appliance as mentioned in the introduction, by means of which problems of the prior art can be eliminated and it is in particular possible for a cooking appliance with a cooking plate and a preferably areal or flat heating device thereunder to be constructed in a practical and inexpensive manner.

The problem is solved by means of a cooking appliance. Advantageous and preferred embodiments of the invention are the subject of the further claims and will be discussed in more detail below. The wording of the claims is incorporated into the content of the description by express reference.

The cooking appliance has a cooking plate, which is advantageously of flat or areal form, and has a heating device thereunder. The cooking plate is intended to be designed or suitable for the direct preparation of food products thereon, as discussed above. The heating device runs parallel to the cooking plate or runs in a plane parallel to the cooking plate, wherein the heating device advantageously bears at least partially against the bottom side of the cooking plate. The heating device particularly advantageously bears over the full area against the bottom side of the cooking plate, whereby the best possible heat transfer can be achieved. The heating device has a flat carrier disc running parallel to the cooking plate, which carrier disc can provide the heating device with its fundamental mechanical stability.

According to the invention, on a bottom side and on a top side of the carrier disc, there are arranged in each case heating means. On both sides, the heating means can in each case substantially cover the carrier disc. Here, the heating means preferably do not completely cover every small surface region, but should cover the surface region substantially with the smallest or fewest possible gaps. Here, both heating means each have at least one heating conductor, preferably numerous heating conductors. A construction of the heating means may advantageously be identical on both sides of the carrier disc, in particular with an identical profile and/or identical construction.

By means of the carrier disc equipped with heating means on both sides, a high overall level of heating power can be achieved. Furthermore, the heating conductors on both sides of the carrier disc may be designed such that a heating conductor on one side of the carrier disc covers a gap or a free region on the other side of the carrier disc. A further advantage lies in the fact that, owing to the heating of the carrier disc on both sides, deformations caused by sheet-induced material expansion can be reduced or even eliminated entirely. This reduces the outlay for a stable construction of the cooking appliance and possible mechanical loads for heating device and/or cooking plate, and also deteriorations in heat transfer as a result of varying spacings between heating device and the cooking plate or the bottom side thereof.

In one embodiment of the invention, the cooking plate is composed of an electrically insulating material, preferably from the group: hard glass, glass ceramic, ceramic, natural stone. The cooking plate is thus preferably composed of a mechanically highly stable and permanently planar material. The materials are specifically also suitable for the direct preparation of food products on the cooking plate; the materials, by contrast to metal, are free from corrosion and, with sensible use, do not become scratched.

The cooking appliance preferably has only a single cooking plate and/or only a single heating device, particularly preferably a single heating device under a single cooking plate. In this way, a cooking appliance can be of simple construction and requires little space, for example much less space than a conventional cooking appliance with multiple cooking positions.

In one possible embodiment of the invention, the carrier disc may be metallic, for example composed of steel or high-grade steel. It may also be composed of composite materials with aluminium, copper and high-grade steel. To bear the heating means or the heating conductors, the carrier disc may then be equipped, in the region thereof, with an electrical insulation, for example composed of a known glass layer or ceramic layer. Heating means in the form of thick-film heating conductors or generally film-type heating conductors can be easily applied to these, particularly advantageously by screen printing or by means of an inkjet process. Furthermore, the carrier disc then exhibits high mechanical stability and good heat conduction from the heating means on the bottom side thereof upward in the direction of the cooking plate.

In an alternative other embodiment of the invention, the carrier disc may be composed of micanite or of a similarly electrically insulating material such as mica, which can be produced even in dimensions from 20 cm to 50 cm or even greater. Similarly to a metallic carrier disc as described above, a thickness of the carrier disc can be relatively small and can amount to at most a few millimetres, for example 0.5 mm to 2 mm or 3 mm.

Carrier discs composed of electrically insulating material such as for example micanite, alternatively also ceramic, have the advantage that they do not need to have any separate abovementioned electrical insulation or insulating layer. To this, too, the heating means may be applied for example in a thick-film process. In the case of a material such as mica or micanite, a surface coating process may also be performed in order to form a smooth and/or closed surface, to which then, in turn, the heating means can be very easily applied. Alternatively, in the case of the carrier disc being produced from micanite, an additive may be added which yields such a smooth or closed surface.

As an alternative to the abovementioned thick-film conductors as heating conductors or as heating means, it would also be possible for thin-film heating conductors to be provided, in particular also in turn in areal form or in the form of tracks or the like which cover a relatively large area.

Specifically for heating means applied directly to the carrier disc in the form of thick-film heating conductors or thin-film heating conductors, connection conductors composed of conductor material with very good electrical conductivity can be applied to the carrier disc. Such conductor material with very good electrical conductivity is normally used for forming conductor tracks or feed lines on corresponding carriers. The heating means are connected to, or make contact with, connection conductors or corresponding conductor tracks. In particular at their two opposite ends defined by a current flow direction through the heating means or a heating conductor, the heating conductors make contact with or overlap or lie on the connection conductors or conductor tracks, in particular at connection panels. It is thus advantageous for one connection conductor to be provided per side of the carrier disc, under some circumstances also two.

A stated current flow direction may advantageously run in a radial direction, that is to say between a central point of the areal extent of the heating means and a radial outer region of the heating means.

If the heating means have heating conductors, in particular in the form of thick-film heating conductors, which form panels, tracks or strips and advantageously substantially in a radial direction, a central region on at least one side of the carrier disc may be free from the heating conductors, advantageously on both sides of the carrier disc. In the central region there may be provided an above-described connection conductor, or the conductor material with good electrical conductivity as a conductor track of a connection conductor of the type, in a form which is narrow or has a small width in relation to the heating conductors, but a large length. It may run in spiral form or advantageously in meandering form and, in the central region, form a heating element, where this would otherwise not be possible with the material of the main heating conductor owing to a profile of conductor cross sections. It is thus possible for an otherwise possibly unheated central region to likewise be heated with little outlay in terms of production. The conductor material, too, may generally be applied to the carrier disc in a film process, advantageously likewise in a thick-film process, particularly advantageously by screen printing, or alternatively in a spraying process or in an inkjet process. In the latter case, the printing medium is advantageously of somewhat more inviscid form.

For the heating device, any desired surface power densities within a broad range may be provided, in a manner dependent on the desired temperature on the cooking plate for the preparation of food products. A surface power density may lie between 0.5 W/cm$^2$ and 15 W/cm$^2$, advantageously between 1.5 W/cm$^2$ and 10 W/cm$^2$, for the food products mentioned in the introduction such as pancakes or cakes. To be able to grill meat or the like directly on the cooking plate, relatively high area power densities are required, advantageously between 6 W/cm$^2$ or 8 W/cm$^2$ and 10 W/cm$^2$.

The heating conductors themselves may be composed of a resistance material such as has been described in the U.S. patent application from the same applicant with the file number U.S. application Ser. No. 15/601,285 and the filing date of May 22, 2017. Such resistance material is particularly suitable if the heating conductors or individual partial heating conductors thereof, which between two electrical terminals are composed only of the resistance material, have a width which exceeds the length, preferably by at least 50% to 150%.

The problem, mentioned in the introduction, of possible bending of a carrier disc in the case of heating means being provided only on one side has, in the context of the invention, led to the provision of heating means on both sides of the carrier disc. If, at the top side of the carrier disc, owing to the proximity to or direct abutment against the bottom side of the cooking plate, more heat is removed than at the bottom side of the carrier disc, then it may advantageously be provided that the surface power density is higher there than at the bottom side of the carrier disc. The surface power density may, there, be higher by up to 10% or even up to 20%. This value may preferably be empirically determined and should be defined such that the temperature conditions on both sides of the carrier disc are approximately equal in order to prevent unilateral mechanical loading of the carrier disc.

In a further possible embodiment of the invention, if the cooking appliance or the carrier disc has dimensions of greater than 25 cm length and/or width, in order to reduce mechanical loads at the outer regions or at the outer edge owing to thermal expansion, it may be provided that slots are formed here approximately in a radial direction. The slots may have a length of 1 cm to 3 cm or even 5 cm. Here, it should however be provided that the heating conductors do not cover such slots.

In a further possible embodiment of the invention, a temperature sensor may be provided on the heating device or on the cooking appliance. A temperature sensor of the type serves in particular for discovering a possible excessive temperature or an excessively high temperature at the cooking plate, for the purposes of avoiding the latter, in particular for the purposes of preventing damage to the cooking plate. A temperature sensor may advantageously be formed as a thermocouple, because these are mechanically robust and easy to use. Furthermore, it may be provided that a temperature sensor is arranged between the heating device and the bottom side of the cooking plate, or bears directly and immediately against the bottom side of the cooking plate. It is thus possible for the temperature thereof to be determined and monitored in as effective a manner as possible. Specifically even with an abovementioned thermocouple as temperature sensor, this is easily possible because a thermocouple has small dimensions, in particular a very small height. For this purpose, thermocouples also have the great advantage that they are highly temperature-resistant and mechanically robust. A temperature sensor can be placed, together with connection line, on the top of the heating device. Alternatively, a temperature sensor may also be printed on or fitted or soldered onto the carrier, for example a carrier composed of or with micanite. In general, a spacing of the temperature sensor to a heating conductor may advantageously be greater than a combined thickness of the cooking plate and of the carrier, advantageously composed of micanite.

In one embodiment of the invention, it may be provided that an areal cover is provided above the carrier disc or above the heating means on the top side of the carrier disc.

The areal cover may bear directly and immediately against the bottom side of the cooking plate. It may for example also serve for electrical insulation, possibly also as an improved thermal coupling.

In one embodiment of the invention, the cooking appliance may, at its top side, be formed substantially, in particular entirely, by the cooking plate. Below the cooking plate, the cooking appliance may be surrounded laterally outwardly and downwardly by a flat housing which in particular accommodates the heating device and outwardly covers the latter. A housing of the type may also, with a narrow edge, engage around the cooking plate upwardly. Inside the housing, a thermal insulation may be provided in addition to connections and an actuation means. A thermal insulation of the type should surround the heating device laterally outwardly and/or downwardly. In this way, it is sought for as much heat as possible to be released upwardly to the cooking plate. Furthermore, in this way, it is intended to prevent the cooking appliance from becoming too hot to the side or downwardly, in order to reduce the risk of burning of an operator or of underlying surfaces.

These and further features emerge not only from the claims but also from the description and from the drawing, wherein the individual features may be realized in each case individually or severally in the form of sub-combinations in an embodiment of the invention and may be realized in other fields and constitute advantageous and independently protectable embodiments, for which protection is claimed here. The subdivision of the application into in individual sections and subheadings does not restrict the statements made here in terms of their general validity.

BRIEF DESCRIPTION OF THE SEVERAL VIEWS OF THE DRAWINGS

Further advantages and aspects of the invention will emerge from the claims and from the following description of preferred exemplary embodiments of the invention, which are discussed below on the basis of the figures. In the figures:

DETAILED DESCRIPTION

Figure 1:
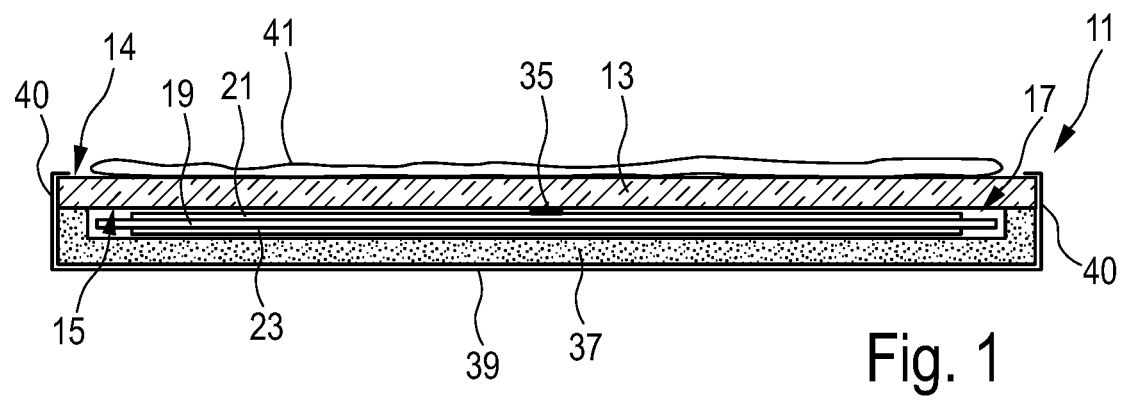
FIG. 1 is a sectional illustration through a cooking appliance according to the invention with a cooking plate and with a heating device thereunder.

FIG. 1 illustrates, in section, a cooking appliance 11 according to the invention, which has a flat form. In plan view, it may be round, in particular circular. Alternatively, in a plan view, it may also have a rectangular or square shape, in particular owing to a simpler and less expensive manufacturing process.

The cooking appliance 11 has a cooking plate 13 composed of glass ceramic. It may have a thickness of a few millimetres, for example 3 mm to 5 mm. For easier production of a cooking plate 13 of the type composed of glass ceramic, an above-described rectangular or square basic shape may be provided for the cooking appliance 11. A top side 14 of the cooking plate 13 is as smooth as possible, such that, for example, food products as described in the introduction, such as cakes 41, can be prepared or baked directly thereon. A bottom side 15 of the cooking plate 13 may also be smooth, or may alternatively have studs, such as is known for glass ceramic plates for hob plates of hobs.

Below the cooking plate 13, there is arranged a flat and areal heating device 17, specifically advantageously with a small spacing to the bottom side 15, wherein the heating device bears partially or substantially against the bottom side. A temperature sensor 35 lies on the top of the heating device 17 or on heating means 21 provided on the top side of the heating device 17. The temperature sensor is advantageously a thermocouple as described in the introduction, with connections not illustrated here. The connections are however easy for a person skilled in the art to implement.

In one embodiment of the invention, it would also be possible for a further intermediate layer, for example with an electrically insulating action, to be provided between the heating device 17 and bottom side 15 of the cooking plate 13. An intermediate layer of the type may for example be composed of a thin micanite disc.

A thermal insulation 37 is provided below the heating device 17. It may have a thickness from a few millimetres to 1 cm or 2 cm, and may advantageously be composed of fibre-containing or fibre-free insulation material, such as is also known for radiation heating devices in hobs. Alternatively, the thermal insulation may be composed of vermiculite. The thermal insulation 37 is, as can be seen, turned upward at the outer edge, and altogether forms a type of plate or shallow bowl. The top sides of the outer edges advantageously bear against the bottom side 15 of the cooking plate 13, such that good thermal insulation is realized even to the side. Furthermore, the mechanical stability that is required can thereby be achieved.

In turn, below the thermal insulation 37, there is provided a housing 39, advantageously composed of metal, in particular sheet metal. The housing 39, by means of a housing rim 40 running in encircling fashion at the outside, not only engages over the edge of the thermal insulation 37 but also extends upward beyond an outer edge of the cooking plate 13, and bears with a small projecting length against the top side 14 of the cooking plate 13. By means of this embracing action, the entire cooking appliance 11 can be easily closed and also easily opened for repair purposes.

Not illustrated in FIG. 1 is an electrical mains connection for the heating device 17 and possibly a controller, in particular an on/off switch and possibly a power adjustment means for the heating device 17. These are however easy for a person skilled in the art to implement, and may have a switch mounted for example on the outside on the housing 39 or the housing rim 40. This may be a so-called energy regulator, such as is known for example from U.S. Pat. No. 6,211,582. Alternatively, it would be necessary, by means of a particular distribution of the heating means on the heating device 17, to create the possibility of activating the heating means in different power stages by means of different parallel connection and/or series connection configurations. The outlay would however then greatly increase.

Figure 2:
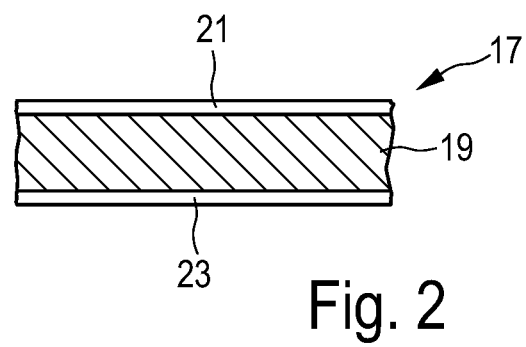
FIG. 2 shows a detail of an enlarged sectional illustration of the heating device of the cooking appliance from FIG. 1.

The sectional illustration of FIG. 2 illustrates an enlarged detail of the heating device 17. The carrier disc 19 is advantageously composed of the micanite discussed in the introduction. The micanite is particularly advantageously treated, at least on its outer side, in order to permit the subsequent application of heating means 21 to the top side and heating means 23 to the bottom side. The micanite may however also be untreated. The heating means 21 and 23 are advantageously applied by means of thick-film processes, as discussed in the introduction. This means that they are thick-film heating conductors composed of a suitable material, in particular a material as described above. Not illustrated in FIG. 2, but easily conceivable, are electrical connections for the heating means 21 and 23, as will be discussed in somewhat more detail below.

Figure 3:
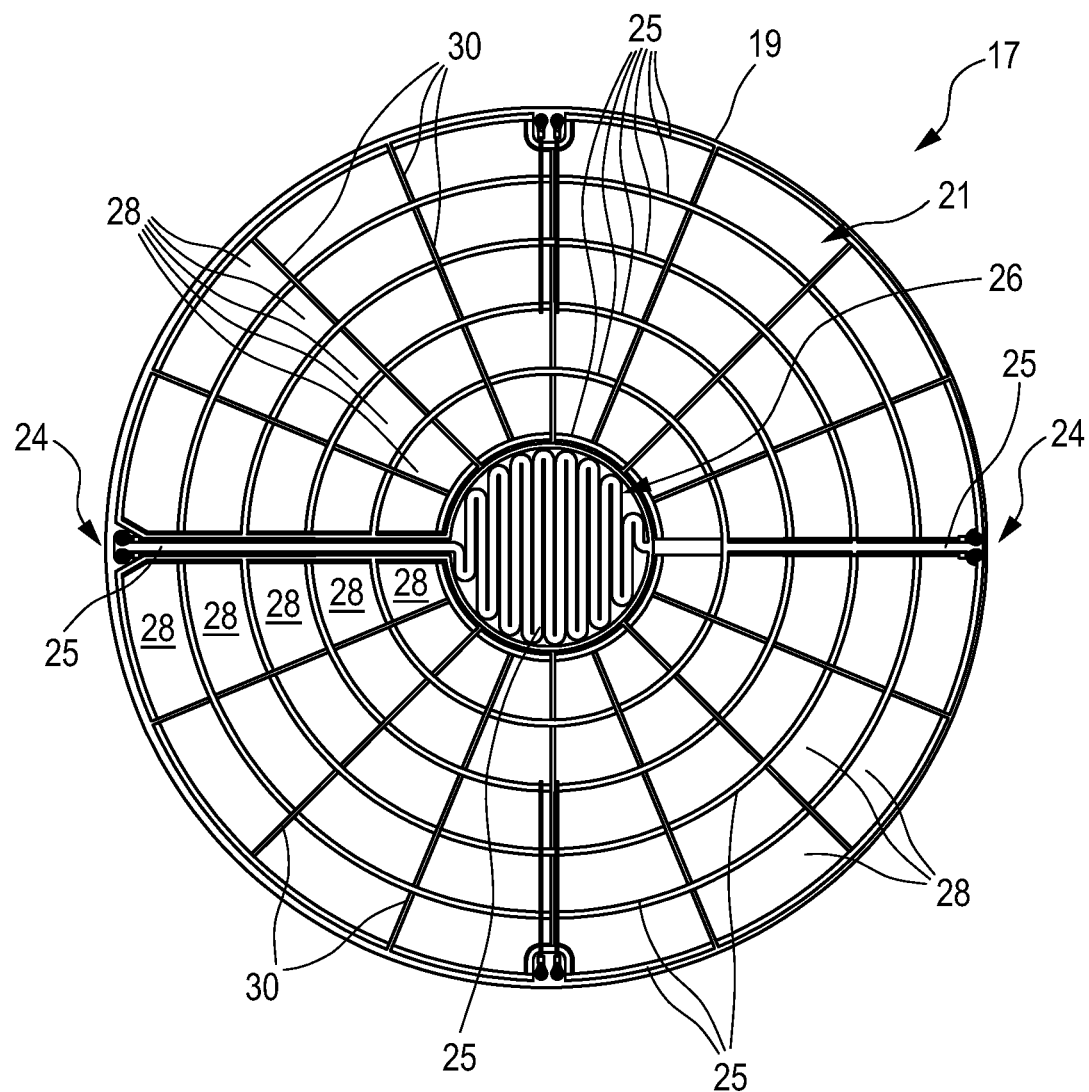
FIG. 3 shows a plan view of the top side of the heating device of the cooking appliance from FIG. 1.

FIG. 3 illustrates a plan view of the heating means 21 on the top side of the carrier disc 19 of the heating device 17. For the heating means 21, connections 24 are provided on opposite outer sides of the carrier disc 19, that is to say in this case two connections to the left and to the right. From the connections 24, conductor tracks 25 extend toward one another or toward the central region. In turn, further conductor tracks extend in a circumferential direction from the specific conductor tracks 25, forming a total of six encircling conductor tracks 25. The encircling conductor tracks 25 are overlapped by heating conductors 28 of the heating means 21, wherein all of the heating conductors 28 have a circular segment shape with equal length in a radial direction, merely different widths in the circumferential direction and different curvature. This means that the heating conductors 28 each form circular ring segments, which partially or possibly even completely overlap the conductor tracks 25 running in a circumferential direction, or are covered by the conductor tracks.

Furthermore, separating troughs 30 are provided which run in a radial direction and over which no material of the heating conductors 28 extends. The separating troughs are also overlapped in the circumferential direction by only every second conductor track 25. The separating troughs 30 begin at an innermost ring of the conductor track 25. The conductor tracks 25 and the heating conductors 28 may be produced in a thick-film process, in particular produced in a screen printing process from respectively suitable conductor pastes, which are then fired.

It important that the radial spacing of the circular encircling conductor tracks 25 is equal in each case. The current flow direction thus runs along the radial direction. Here, the width of the heating conductors 28 in the direction perpendicular to the current flow direction varies somewhat, in particular in the case of the radially inner heating conductors 28. This however can either be compensated by means of a special geometry or width of the separating troughs 30, or alternatively one accepts a somewhat uneven current density and thus heat distribution.

The special interconnection of the heating conductors 28 by means of the conductor tracks 25 is easy to see and can be easily understood from FIG. 3.

In a central region of the heating device 17 or of the carrier disc 19, there is provided a central heating element 26. This is formed by a section of the conductor track 25 with a meandering profile, in order to utilize the circular central area as effectively as possible. Even if the material of the conductor track 25, as has been described in the introduction, normally and advantageously exhibits such good electrical conductivity that it is indeed highly suitable as a conductor track in the case of a normal length, it is possible by means of the visibly very large length of the central heating element 26 for heat generation to be achieved here too.

The heating means 23 on the bottom side of the carrier disc 19 are advantageously of similar form to the heating means 21 on the top side as per FIG. 3, in particular of identical form. It is however particularly advantageous for the arrangement there to be rotationally offset slightly in relation to that of the heating means 21 on the top side, for example by 90°. The connections thereof would thus be in each case between the connections 24 corresponding to FIG. 3. The circular-ring-shaped conductor tracks 25 running in the circumferential direction may, on the bottom side, be provided at exactly the same locations. The separating troughs could also be offset, by half of one spacing, between two separating troughs on the top side, such that a gap in the heat generation for the cooking plate 13 is avoided. Accordingly, the heating means would be rotationally offset with respect to one another in each case by approximately 78.75°. The heating conductors could similarly also be rotationally offset with respect to one another slightly in the radial direction.

By means of a substantially symmetrical and identical design of the heating means 21 on the top side and the heating means 23 on the bottom side, including the respective central heating elements 26, a heating power on the top side of the heating device 17 and on the bottom side 17 can be achieved which is identical in each case. However, should a somewhat different heating power be desired, in particular a greater heating power for the heating means 21 on the top side of the carrier disc 19, in order to allow for the greater release of heat upward to the cooking plate 13, for the temperature conditions that ultimately take effect at the heating device 17, the heating means 21 on the top side may generate 5% to 20% or even 30% more power. Then, an above-described bending of the heating device owing to different heating at one of the sides, in particular at the bottom side, can be reduced or prevented entirely. This however does not have to be provided, and must be implemented substantially in a manner dependent on the type of construction.

That which is claimed:

1. A cooking appliance comprising:
a cooking plate; and
a heating device thereunder,
wherein:
said heating device runs parallel to said cooking plate and bears at least partially against a bottom side of said cooking plate;
said heating device comprises a flat carrier disc running parallel to said cooking plate;
on a bottom side and on a top side of said carrier disc, there are arranged in each case heating means which in each case cover said carrier disc;
both said heating means comprise in each case at least one heating conductor;
said carrier disc is composed of micanite;
said heating means comprises thick-film heating conductors as heating conductors, or are applied in a thick-film process to said carrier disc;
connection conductors are applied to said carrier disc, said connection conductors being composed of conductor material with electrical conductivity;
for each heating conductor, two electrical connection panels are connected to said connection conductors; and
opposing ends of each said heating conductor make contact with said connection conductors.

2. The cooking appliance according to claim 1, wherein said heating device bears fully against said bottom side of said cooking plate.

3. The cooking appliance according to claim 1, wherein a central region of said carrier disc is free on both sides of said carrier disc from heating conductors.

4. The cooking appliance according to claim 1, wherein a surface power density per side of said heating device lies between 0.5 $W/cm^2$ and 15 $W/cm^2$.

5. The cooking appliance according to claim 1, wherein:
said heating device comprises, above said carrier disc or above said heating means on said top side of said carrier disc, an areal heating device; and
said areal heating device bears directly and immediately against a bottom side of said cooking plate.

6. The cooking appliance according to claim 1, wherein said cooking plate is composed of an electrically insulating material.

7. The cooking appliance according to claim 6, wherein said electrically insulating material is from the group: hard glass, glass ceramic, ceramic, and natural stone.

8. The cooking appliance according to claim 1, wherein:
said cooking appliance is, at its top side, formed, by said cooking plate; and
said cooking appliance comprises, below said cooking plate, a flat housing which surrounds and accommodates said heating device laterally outwardly and downwardly.

9. The cooking appliance according to claim 8, wherein said housing comprises, at an inside, a thermal insulation which surrounds said heating device laterally outwardly and/or downwardly.

10. The cooking appliance according to claim 1, wherein a temperature sensor on said heating device is provided.

11. The cooking appliance according to claim 10, wherein said temperature sensor is arranged between said heating device and a bottom side of said cooking plate, or bears directly and immediately against said bottom side of said cooking plate.

12. The cooking appliance according to claim 10, wherein a spacing of said temperature sensor to one said heating conductor is greater than a combined thickness of said cooking plate and of said carrier.

13. A cooking appliance comprising:
a cooking plate; and
a heating device thereunder,
wherein:
said heating device runs parallel to said cooking plate and bears at least partially against a bottom side of said cooking plate;
said heating device comprises a flat carrier disc running parallel to said cooking plate;
on a bottom side and on a top side of said carrier disc, there are arranged in each case heating means which in each case cover said carrier disc;
both said heating means comprise in each case at least one heating conductor;
said carrier disc is provided with an electrical insulation at least in a region of said heating means, and
said carrier disc is metallic and composed of a material from the group: steel, high-grade steel, composite materials with aluminum, copper and high-grade steel.

14. The cooking appliance according to claim 13, wherein at least one of:
said heating device bears fully against said bottom side of said cooking plate; or
a central region of said carrier disc is free on both sides of said carrier disc from heating conductors.

15. The cooking appliance according to claim 13, wherein:
said heating device comprises, above said carrier disc or above said heating means on said top side of said carrier disc, an areal heating device; and
said areal heating device bears directly and immediately against a bottom side of said cooking plate.

16. The cooking appliance according to claim 13, wherein a temperature sensor on said heating device is provided.

17. The cooking appliance according to claim 16, wherein at least one of:
said temperature sensor is arranged between said heating device and a bottom side of said cooking plate, or bears directly and immediately against said bottom side of said cooking plate; or
a spacing of said temperature sensor to one said heating conductor is greater than a combined thickness of said cooking plate and of said carrier.

18. A cooking appliance comprising:
a cooking plate; and
a heating device thereunder,
wherein:
said heating device runs parallel to said cooking plate and bears at least partially against a bottom side of said cooking plate;
said heating device comprises a flat carrier disc running parallel to said cooking plate;
on a bottom side and on a top side of said carrier disc, there are arranged in each case heating means which in each case cover said carrier disc;
both said heating means comprise in each case at least one heating conductor;
said heating means comprises thick-film heating conductors as heating conductors, or are applied in a thick-film process to said carrier disc;
connection conductors are provided being applied to said carrier disc;
said connection conductors are composed of conductor material with very good electrical conductivity;
for each heating means, two electrical connection panels are provided being connected to said connection conductors; and
said heating conductors, at their two opposite ends defined by a current flow direction, make contact with said connection conductors.

19. The cooking appliance according to claim 18, wherein at least one of:
said heating device bears fully against said bottom side of said cooking plate; or
a central region of said carrier disc is free on both sides of said carrier disc from heating conductors.

20. The cooking appliance according to claim 18, wherein:
said cooking appliance is, at its top side, formed, by said cooking plate;
said cooking appliance comprises, below said cooking plate, a flat housing which surrounds and accommodates said heating device laterally outwardly and downwardly; and
said housing comprises, at an inside, a thermal insulation which surrounds said heating device laterally outwardly and/or downwardly.

21. The cooking appliance according to claim 18, wherein a temperature sensor on said heating device is provided.

22. The cooking appliance according to claim 21, wherein at least one of:
said temperature sensor is arranged between said heating device and a bottom side of said cooking plate, or bears directly and immediately against said bottom side of said cooking plate; or
a spacing of said temperature sensor to one said heating conductor is greater than a combined thickness of said cooking plate and of said carrier.

* * * * *